(12) United States Patent
Philpott et al.

(10) Patent No.: US 6,371,182 B1
(45) Date of Patent: Apr. 16, 2002

(54) RUNFLAT TIRE WITH DUAL-MODULUS UNDERLAY

(75) Inventors: Frank Philpott, Waldbredimus (LU); Laurent Colantonio, Bastogne; Gia Van Nguyen, Rossignol, both of (BE); Alain Emile Francois Roesgen, Luxembourg (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/511,754

(22) Filed: Feb. 24, 2000

(51) Int. Cl.[7] .......................... B60C 17/00; B60C 9/20; B60C 9/22
(52) U.S. Cl. .................... 152/517; 152/527; 152/531
(58) Field of Search .................. 152/531, 527, 152/533, 517

(56) References Cited

U.S. PATENT DOCUMENTS

| 4,059,138 A | 11/1977 | Mirtain et al. |
| 4,111,249 A | 9/1978 | Markow |
| 4,428,411 A | 1/1984 | Markow et al. |
| 4,456,048 A | 6/1984 | Markow et al. |
| 4,459,167 A | 7/1984 | Markow et al. |
| 5,054,532 A | * 10/1991 | Kohno et al. ................. 152/527 |
| 5,427,166 A | * 6/1995 | Willard, Jr. .................. 152/454 |
| 5,558,155 A | * 9/1996 | Nakayasu et al. ........... 152/527 |
| 5,871,600 A | * 2/1999 | Oare et al. ................... 152/458 |
| 5,996,662 A | * 12/1999 | Cluzel ......................... 152/531 |

FOREIGN PATENT DOCUMENTS

| WO | WO00/01544 | 1/2000 |

* cited by examiner

Primary Examiner—Edward J. Cain
Assistant Examiner—Katarzyna W. Lee
(74) Attorney, Agent, or Firm—Howard M. Cohn

(57) ABSTRACT

A pneumatic radial ply runflat tire (200) has a tread (210), belt structure (212), a carcass (216), and an underlay (234) disposed between the belt structure and the carcass. The carcass (216) comprises two sidewalls (226), two beads (220), and one or more radial plies (222,224). The tire (200) is characterized by the underlay (234) having reinforcement cords (236) with turns aligned parallel to the tire's equatorial plane, the cords (236) exhibiting negligible modulus of elasticity ("modulus") below a threshold elongation and high modulus above the threshold elongation. The underlay (234) stiffens the tire during runflat operation but not during normal inflated operation.

7 Claims, 3 Drawing Sheets

RUNFLAT TIRE WITH DUAL-MODULUS UNDERLAY

TECHNICAL FIELD

The present invention relates to a pneumatic radial ply runflat tire. More particularly, the present invention relates to an improved underlay, between the belts and the carcass of a radial ply runflat tire, that increases tire stiffness during runflat operation but not during normal inflated operation.

BACKGROUND OF THE INVENTION

Various methods have been devised for enabling the safe continued operation of deflated or underinflated (flat) tires without damaging the tire further and without compromising vehicle handling while driving to where the tire can be changed. Loss of tire pressure can result from a variety of causes such as a deteriorated seal between the tire and rim or a tire puncture by a sharp object such as a nail.

Pneumatic tires designed for continued operation under deflated or underinflated conditions are referred to as "extended mobility technology" tires or "EMT" tires. They are also called "runflat" tires, as they are capable of being driven in the flat condition. Runflat tires are designed to be driven in the deflated condition, whereas the conventional pneumatic tire's sidewalls and tread buckle when subjected to a vehicle load while deflated. The sidewalls and internal surfaces of runflat tires do not collapse or buckle. In general, the terms "EMT" and "runflat" mean that the tire structure alone has sufficient strength to support the vehicle load when the tire is operated in the deflated state.

Numerous other methods and tire construction have been used to achieve runflat tire designs. For example, U.S. Pat. No. 4,111,249 discloses a runflat tire having an annular compression band (hoop), typically 15 centimeters wide, of solid high-strength metal or reinforced composite, located below the tread either under or embedded within the carcass. U.S. Pat. No. 4,059,138 discloses a runflat tire having, around the metal hub, an elastomeric ring that supports the inner central portion of the carcass when the tire is deflated.

Generally, runflat tires incorporate reinforced sidewalls that are sufficiently rigid so as not to collapse or buckle. Such sidewalls are thicker and stiffer than in conventional tires, so that the tire's load can be carried by a deflated tire without compromising vehicle handling until the tire can be repaired or replaced. The methods of sidewall stiffening include the incorporation of wedge inserts ("inserts"), which are fillers generally having a cross-sectional crescent shape. Such inserts are located in the inner peripheral surface of the sidewall portion of the carcass, which is the region in the tire experiencing the greatest flex under load. In such runflat designs, the entire sidewall has an approximately uniform thickness corresponding to the thickness of the bead region, so as to provide runflat supporting rigidity. The sidewalls of such tires, when operated in the deflated condition, experience a net compressive load in which the outer portions of the sidewalls are under tension due to the bending stresses while the insides are correspondingly in compression, especially in the region of the sidewall midway between the tire's bead region and the ground-contacting portion of the tread.

During runflat operation (i.e. while running underinflated), due to the large mass of rubber required to stiffen and reinforce the runflat tire's sidewalls, heat buildup from cyclical flexure of the sidewalls is a major cause of tire failure, especially when the deflated tire is operated for prolonged periods of time and at high speeds. During normal inflated operation, the hysteresis of the material of the thickened runflat tire's sidewalls contributes to its flexural heating, carcass fatigue, and rolling resistance, which reduces the vehicle's fuel efficiency. The additional weight of the insert is also a disadvantage in handling and mounting a runflat tire.

In general, runflat tire design is based on the installation of one or more wedge inserts in each sidewall flex area. The wedge inserts, in combination with the ply structure, add rigidity to the sidewalls in the absence of air pressure during runflat operation. But this method has several drawbacks, including increased tire weight and heat buildup in the inserts, especially during runflat operation. Moreover, during runflat operation, bending stresses tend to be transmitted to the portion of the tread that contacts the ground, causing the central portions of the tread to tend to buckle upward from the ground, causing poor vehicle handling and reduced runflat tread life.

Bending stresses from the reinforced sidewall structures cause the footprint (portion of the tread containing the ground) to buckle upward in a meridionally bowed profile. Bending stresses from the tread portion adjacent to the footprint cause the footprint to buckle upward in a circumferentially bowed profile.

To reduce the aforementioned problems associated with stiffening the sidewalls with inserts, tire rigidity can be achieved by stiffening the tread with stiffening structural members under the tread. For example, U.S. Pat. Nos. 4,459,167 and 4,428,411 disclose runflat tires having an annular structural helical coil compression element on the inside surface of the carcass beneath the tread. This design stiffens the tire during runflat operation at the expense of stiffening the tire during normal inflation operation. PCT patent application PCT/US98/14054, filed Jul. 7, 1998, having a common assignee with the present invention, discloses a fabric underlay, between the belts and radial plies, that is reinforced by high-modulus cords that are parallel to the tire's equatorial plane. The underlay stiffens the tread by widening the gap between the belts and plies. This design, too, stiffens the tire during runflat operation at the expense of stiffening the tire during normal inflation operation. U.S. Pat. No. 4,456,048 discloses a runflat tire having a "band" (hoop) in the tire's crown, whose shape exhibits dual-modulus of bending deflection. The shape can be either multiple "lands" (prisms) separated by "slots", "V-shaped members" connected by "annular fibers", "corrugated annular strips" reinforced with "radial struts", or "a band element with an annular anticlastic shape". This design achieves the desired effect of stiffening the tire only in runflat operation (not in normal inflated operation), but this design is prohibitively costly to manufacture.

It is therefore desirable to have a runflat tire exhibiting significant rigidity during runflat operation but minimal rigidity during normal inflated operation. This would provide a softer ride during normal inflated operation and more rigid support during runflat operation. During both runflat and normal inflated operation, it would provide better handling and less rolling resistance, heat and tire degradation.

SUMMARY OF THE INVENTION

The present invention relates to a pneumatic radial ply runflat tire having a tread, a belt structure ("belts") under the tread, a carcass, and an underlay between the belts and the carcass. The carcass has two inextensible annular beads, a radial ply structure and two sidewalls each reinforced with one or more wedge inserts. The tire is characterized by the underlay comprising a wound reinforcement cord disposed circumferentially under the belts with turns aligned parallel to the tire's equatorial plane, the cord exhibiting dual modulus of elasticity ("modulus")—negligible (low or no) modulus below a threshold elongation and high modulus above the threshold elongation, and preferably exhibiting significant compressive modulus. A cord with such characteristics is also called a "0 degree high elongation cord". The underlay may comprise one continuous cord spirally-wound to form the entire underlay, or may comprise a discontinuous cord (broken in places).

During normal inflated operation, the underlay does not stiffen the tire, because the layer has low modulus at low elongation, yielding a soft ride that is comparable to a similar tire without the underlay.

During runflat operation, the tread on either side of the footprint (section of tread contacting the ground) buckles outward, putting the tread's outer surface under tension and inner surface under compression, with a "neutral bending axis" in-between. The underlay is in the inner, compression, side of the neutral bending axis, and so exhibits a significant compressive modulus, and hence stiffens the tread on either side of the footprint. The footprint buckles circumferentially upward, putting the footprint's outer surface under compression and inner surface under tension, with a "neutral bending axis" in-between. The underlay is on the inner, tension, side of the neutral bending axis, and so exhibits high modulus, and hence stiffens the tread at the footprint.

In summary, the underlay stiffens the tire during runflat operation but not during normal inflated operation. During runflat operation, this reduces flexural wear and heat and improves ground contact. During normal inflated operation, this yields a soft ride.

Employing dual-modulus cords in the underlay simplifies manufacturing, rendering the underlay easier to stretch around the green carcass when the green carcass is expanded into engagement with the underlay.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in some of the drawings may be illustrated not-to-scale for illustrative clarity.

In the drawings, the hundredth's place of each reference number usually matches the figure number, and similar elements are usually referred to by similar reference numbers. For example, element 199 in FIG. 1, element 299 in FIG. 2, and element 399 in FIG. 3 might indicate corresponding or substantially similar elements.

The same element appearing in different figures is usually given the same reference number in all figures.

In a single drawing, similar elements may be assigned the same number. For example, both beads of the same tire may be assigned the same numeral.

For illustrative clarity, the cross-sectional views presented herein may be in the form "near-sighted" cross-sectional views, omitting certain background lines that would otherwise be visible in a true cross-sectional view.

Figure 1:
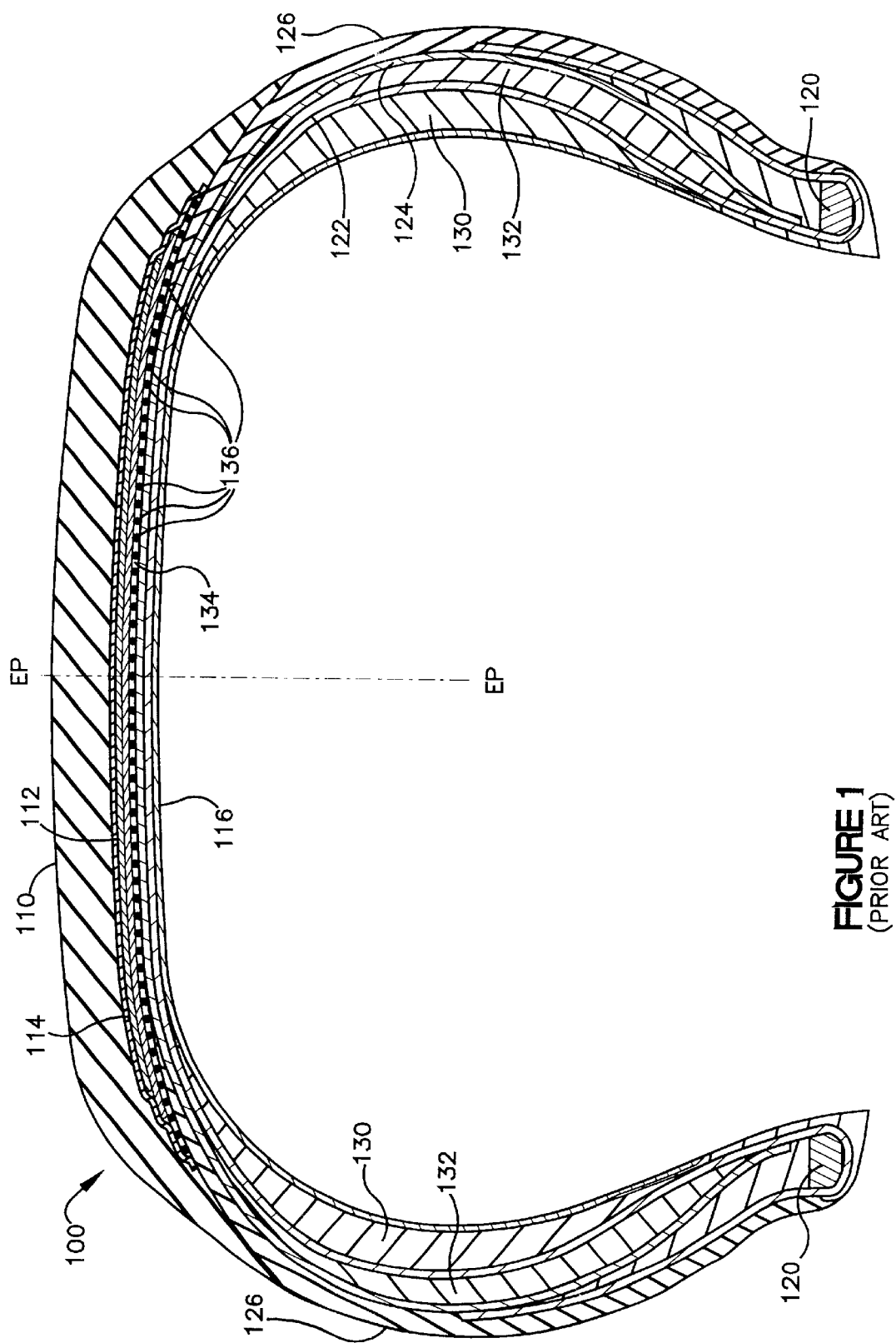
Figure 2:
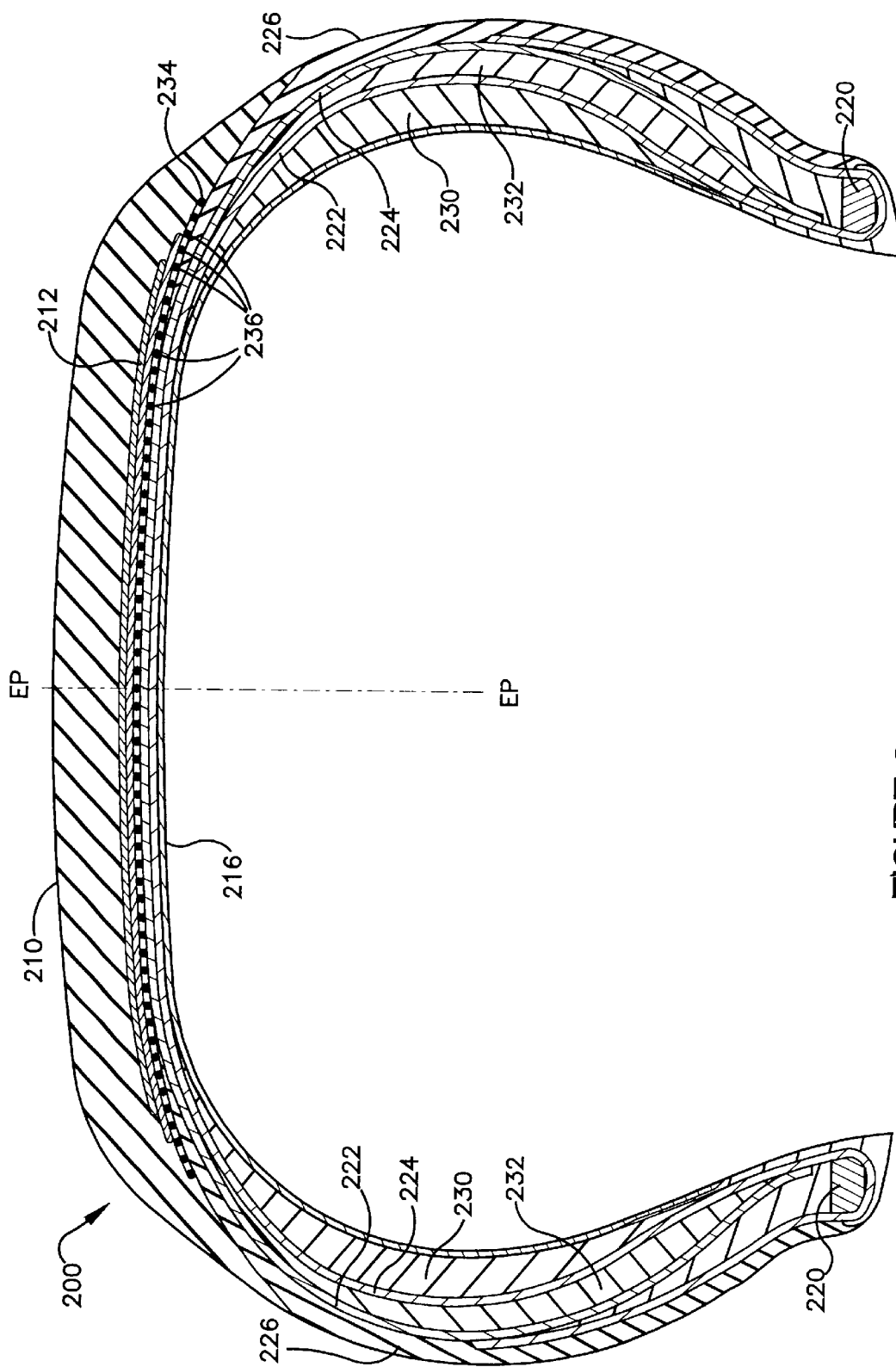
Figure 3:
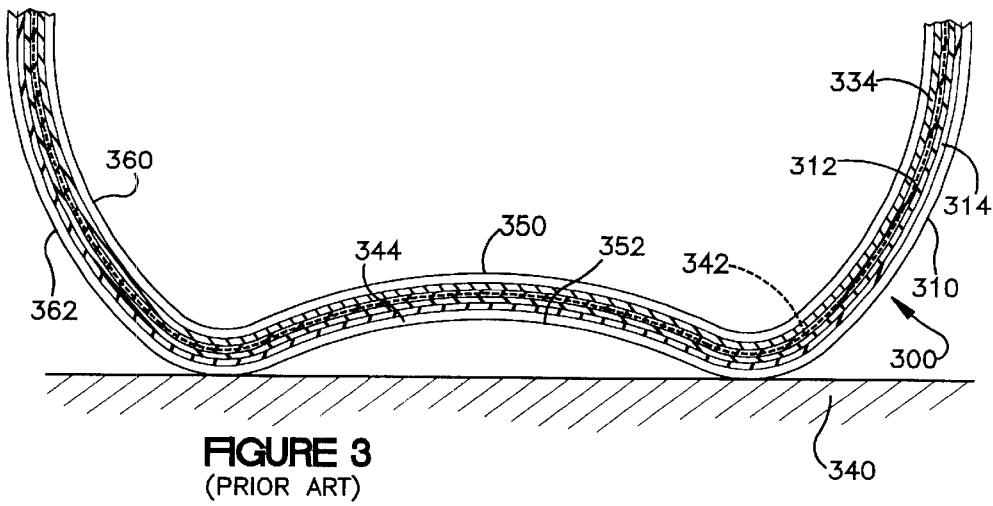
Figure 4:
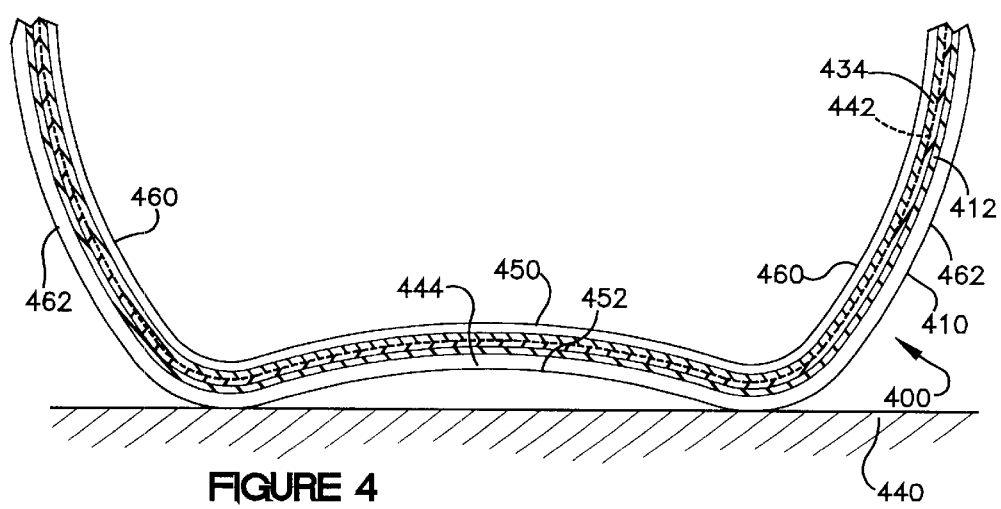
Figure 5:
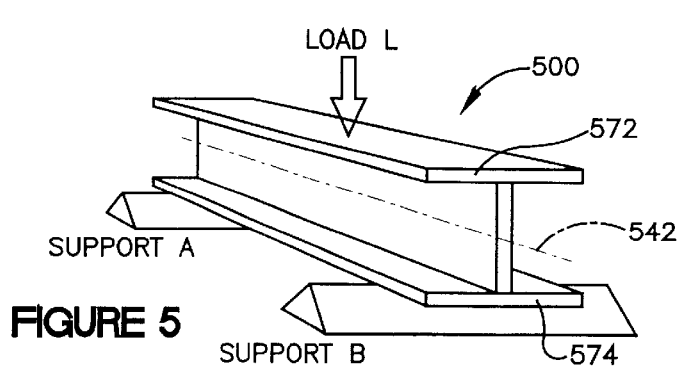

The structure, operation, and advantages of the invention will become further apparent upon consideration of the following description taken in conjunction with the accompanying drawings, wherein:

FIG. 1 is a cross-sectional view of an exemplary prior art runflat tire;

FIG. 2 is a cross-sectional view of a runflat tire incorporating the present invention;

FIG. 3 is a schematic meridional cross-sectional view of the bottom portion of the prior art tire of FIG. 1 when being driven in runflat mode;

FIG. 4 is a schematic meridional cross-sectional view of the bottom portion of the tire of FIG. 2 when being driven in runflat mode; and FIG. 5 is a perspective view of a beam under a load.

DEFINITIONS

"Bead" means an annular tensile member that is associated with holding the tire to the rim. The beads are wrapped by ply cords and shaped, with or without other reinforcement elements such as flippers, chippers, apexes or fillers, toe guards and chafers.

"Belt structure" means at least two annular layers or plies of parallel cords, woven or unwoven, underlying the tread, unanchored to the bead, and having both left and right cord angles in the range from 18° to 30° relative to the equatorial plane of the tire.

"Carcass" means the tire structure apart from the belt structure and the tread. Its main components are the sidewalls, plies and bead areas.

"Circumferential" most often means circular lines or directions extending along the perimeter of the surface of the annular tread perpendicular to the axial direction. It can also refer to the direction of the sets of adjacent circular curves whose radii define the axial curvature of the tread, as viewed in cross section.

"Cord" means one of the reinforcement strands of which the plies and other cord reinforced components of the tire are comprised.

"Equatorial plane" means the plane perpendicular to the tire's axis of rotation and passing through the center of its tread; or the plane containing the circumferential centerline of the tread.

"Footprint" means the contact area of the tire tread with a flat surface at zero speed and under normal load and pressure.

"Green carcass" means the uncured tire carcass prior to the installation of the belt structure and tread.

"Wedge Insert" or "insert" means the cross-sectionally crescent- or wedge-shaped reinforcement typically used to reinforce the sidewalls of runflat-type tires.

"Meridional" refers to a direction parallel to the axial direction but, more specifically, to a laterally disposed curved line that lies in a plane that includes the axis of the tire.

"Normal inflated operation" or "normal inflated mode" means tire use under the inflation pressure and load assigned by the appropriate standards organization for the service condition for the tire.

"Ply" means a cord-reinforced layer of rubber-coated radially deployed or otherwise parallel cords.

"Radial" and "radially" mean directions radially toward or away from the axis of rotation of the tire.

"Radial ply structure" means the one or more carcass plies of which at least one ply has reinforcing cords oriented at an angle of between 65° and 90° with respect to the equatorial plane of the tire.

"Radial ply tire" means a belted or circumferentially-restricted pneumatic tire in which at least one ply has cords which extend from bead to bead are laid at cord angles between 65° and 90° with respect to the equatorial plane of the tire.

"Runflat operation" or "runflat mode" means tire use when the tire is being driven while deflated.

"Sidewall" means that portion of a tire between the tread and the bead.

DETAILED DESCRIPTION OF THE INVENTION

Prior Art

FIG. 1 shows a meridional cross section of a prior art pneumatic radial runflat tire 100 similar to that of PCT/US98/14054 (cited in the Background section). The tire 100 has a tread 110, a belt structure ("belts") 112 comprising one or more belts, a fabric overlay 114 over the belts 112, a fabric underlay 134 under the belts 112 reinforced by high-modulus cords 136 (or "underlay cords" or "reinforcement cords") that are wound parallel to the equatorial plane (EP) of the tire, and a carcass 116 under the underlay 134. The carcass has two inextensible annular beads 120, an inner radial ply 122, an outer radial ply 124 and two sidewalls 126 each reinforced with an inner wedge insert 130 and an outer wedge insert 132 which give the tire 100 a limited runflat capability. According to PCT/US98/14054, by widening the gap between the belts 112 and plies 122,124, the underlay 134 stiffens the tread during runflat operation at the expense of stiffening the tread during normal inflation operation.

The structural reinforcement in the sidewall area of the tire 100 substantially increases the overall thickness of the sidewalls 126 in order to support the tire's load with minimal sidewall deformation in runflat operation. Such runflat tire designs provide reasonable, though not ideal, vehicle handling and performance in normal inflated operation and reasonable tire life and vehicle handling in runflat operation. Runflat tires generally weigh more than equivalent non-runflat tires because of the additional weight of the reinforcement material in the sidewalls. This problematic additional weight is generally greater in high-profile runflat tires because of the need for larger inserts in the larger sidewalls.

Ideally, reinforced sidewalls of a runflat tire should be flexible during normal inflated operation (as flexible as those of a corresponding-sized non-runflat tire), yet rigid during runflat operation. However, this cannot be achieved by conventional wedge inserts, so the stiffness of wedge inserts is designed to be some compromise value in-between, yielding greater than optimum stiffness during normal inflated operation and less than optimum stiffness during runflat operation.

Preferred Embodiment

FIG. 2 shows a meridional cross-section of a pneumatic radial runflat tire 200 according to the present invention, having a similar construction to that of the prior art runflat tire of FIG. 1, but with a different type of underlay., The tire 200 has a tread 210, a belt structure ("belts") 212 comprising one or more belts, an underlay 234 under the belts 212 reinforced by one or more cords 236 (or "underlay cords" or "reinforcement cords") that are wound parallel to the equatorial plane (EP) of the tire, and a carcass 216. The carcass has two inextensible annular beads 220, one or more plies, such as an inner radial ply 222 and an outer radial ply 224, and two sidewalls 226 each reinforced with one or more wedge inserts, such as an inner wedge insert 230 and an outer wedge insert 232 which contribute to tire rigidity. Although a tire of the present invention can have an overlay, an overlay is not required for this invention nor is it shown in this preferred embodiment.

The tire 200 is characterized by the underlay reinforcing cords 236 exhibiting dual modulus of elasticity ("modulus") under tension—negligible modulus below a threshold elongation and high modulus above the threshold elongation, and exhibiting a significant, though not necessarily high, modulus under compression. The turns of the underlay cord 236 are approximately parallel to the tire's equatorial plane and embedded in a rubber matrix.

The dual-modulus capability can be achieved in any of a variety of ways. For example, the cord can be made of a material that intrinsically has dual-modulus.

Alternatively, the cord can be made of a higher-modulus strand and a shorter lower-modulus strand in a single sheath. As another design of a dual-modulus cord, U.S. Pat. No. 5,419,383 discloses a tire having belt cords with a higher modulus organic strand and a shorter lower modulus organic strand twisted together. (This design differs from the present invention in that it does not provide runflat ability, and the cords are not below the belt.) Similarly, U.S. Pat. No. 5,558,144 discloses a jointless "band belt", radially outside the "breaker belt", having an organic low-modulus thread and an organic high-modulus thread twisted together. (This design differs from the present invention in that it does not provide runflat ability, the "band belt" is not under the "breaker belt", and its low-modulus behavior is not expressly functional in normal inflated operation.) Similarly, U.S. Pat. No. 4,877,073 discloses an overlay ply having a dual-modulus non-metallic cable comprising two yarns, one yarn not twisted or twisted in a first direction, and the other yarn twisted in the opposite direction, and the cable is twisted in the opposite direction of the twist of the yarn having the larger twist. (This design differs from the present invention in that it does not provide runflat ability, and the cable is not under the belts.) Similarly, PCT/US99/11081 filed May 1999, having a common assignee with the present invention, discloses a variable-modulus cord, for use in an outermost ply of a runflat tire, comprising a low modulus core material wound with high-modulus cords.

The underlay 234 has typically 8 to 18 turns of cord 236 per lateral inch, and the cords are spaced typically 0.35 to 1.50 mm (millimeters) apart. The cords 236 have a typically circular or polygonal cross-sectional shape and are typically 0.65 to 1.85 mm in cross-sectional diameter. The modulus of each cord 236 is typically less than 5000 Mpa below a lower threshold elongation of 0.5–3% (preferably 1–2%), and is typically 80,000–210,000 Mpa (preferably 90,000–150,000 Mpa) above an upper threshold elongation of 1–3%. The annular turns of cord 236 are parallel with each other and aligned typically 0–5 degrees relative to the equatorial plane. The turns of cord 236 are embedded within a green rubber, such as usual breaker coatings.

The material of the cord 236 can be a polymer or metal or a combination of both. A steel wire (monofilament) or cable can exhibit the required dual-modulus characteristic if it is preformed into a non-straight shape (such as coil or zigzag), which exhibits low modulus at low elongation and high modulus when elongated to a straight shape. A cord 236 comprised of 3 strands of wire filaments of different moduli twisted together has been found to yield good dual-modulus characteristics for use in the present invention.

During the manufacturing process of the tire 200 of the present invention, the underlay 234 is installed as a circumferential helically-wound layer between the belts 212 and the green carcass 216. Then, the green carcass 216 is blown up to engage the underlay 234, the belts 212 and the tread 210 to form a completed green tire 200. The resulting green tire 200 is then blown up in the curing mold.

Although this embodiment, shown in FIG. 2, has two plies 222,224, it is within the scope of the invention to have more or fewer plies. Although this embodiment has two wedge inserts 230,232 in each sidewall 226, it is within the scope of the invention to have more or fewer wedge inserts. Although the cords 236 of this embodiment exhibit dual modulus, it is within the scope of the invention for the cords 236 to exhibit three or more modulus levels or even a smoothly varying modulus, as long as the cords 236 exhibit negligible modulus in normal inflated mode and high modulus in runflat mode. Although the underlay 234 in this embodiment comprises one continuous cord 236 spirally-wound to form the entire underlay 234, it is within the scope of the invention that the cord 236 be discontinuous (broken in places). Although the underlay 234 in this embodiment is one layer, it may be comprised of multiple radially-overlapping layers, formed from either one long length of ply material or separate lengths of ply material, and the cords of overlapping layers can be oriented overlapping each other (cord-over-cord) or interleaved ("quincunxes"; each cord disposed over the space between two cords in a lower layer) for higher cord stacking density. The underlay width may be larger or narrower or of equal width to the breaker package. A compound insert may be set between the underlay and the breaker package.

Principle of Operation

The principle of operation of the present invention rests on the following general principle about elongate structures under bending stress, as illustrated in FIG. 5. FIG. 5 shows an elongate structural beam 500 resting on two supports A and B at its two ends and under flexural (bending) stress from a load L at its center. The entire upper portion of the beam 500, including the top flange 572, is under compression, and the lower portion of the beam 500, including the bottom flange 574, is under tension. A neutral bending axis 542 is the boundary between the portion under compression and the portion under tension. There is no stress (either compression or tension) along the neutral bending axis 542.

An elongate structural member, such as the beam 500, is stiffened when either the material of the compression side has increased compressive modulus or the material of the tension side has increased tensile modulus. This principle is used to explain the principle of operation of the present invention, as illustrated in FIGS. 3 and 4.

FIG. 3 is a cross-section of the bottom portion of a prior art tire 300 (identical to the prior art tire 100 of FIG. 1), cut along the tire's equatorial plane, when deflated and being driven in runflat mode. For clarity, only the tread 310, belts 312, overlay 314 and underlay 334 are shown. The footprint 344 is the portion of the tread contacting the road surface 340.

In runflat mode, the center of the footprint 344 buckles circumferentially upward, as shown, raising the center of the footprint 344 off the ground. This yields poor steering stability, a swerving ride, flex heating, tread wear and bending fatigue. The footprint's inward bow puts the footprint's inner surface 350 under tension and footprint's outer surface 352 under compression, with a neutral bending axis 342 in-between. Depending on the underlay's stiffness and the sharpness of the footprint bend, the neutral bending axis 342 can be within the belts 312 near the underlay 334 (as shown) or between the belts 312 and the underlay 334, so compression resistance of the belts contributes little or nothing to tire rigidity. The underlay 334 is on the tension side of the neutral bending axis 342 and so does contribute significantly to tire rigidity. The portion of the overlay 314 in the footprint region is on the side of the neutral bending axis 342 experiencing compression against which the overlay 314 offers no resistance, because it is only fabric, and hence, the overlay 314 contributes no stiffness in the footprint area.

In runflat mode, on either side of the footprint 344, the tread 310 bends sharply (buckles outward) under the vehicle's weight. The tread's outward bow puts the inner surface 360 under compression and the outer surface 362 under tension, with the neutral bending axis 342 in-between. In this area, too, since the belts 312 are on the neutral bending axis 342, they do not contribute to tire rigidity. The underlay 334 is on the side of the neutral bending axis 342 experiencing compression against which the underlay 334 offers no resistance, and hence contributes no rigidity to the tire. The overlay 314 in this region is on the side of the neutral bending axis 342 experiencing tension against which the overlay 314 offers some resistance, but the overlay 314 contributes negligible rigidity since it is very close to the neutral bending axis 342.

In normal inflated mode, the footprint 344 is flat against the road surface 340, so the underlay 334 is under significant stress, though lower than in runflat mode, and so exhibits significant modulus, though lower than in runflat mode, and hence contributes significant rigidity, though lower than in runflat mode, thus yielding an uncomfortably rigid ride. Reducing the stiffness of the underlay cord 336 to soften the normal inflation mode ride will degrade runflat mode rigidity. Stiffening the underlay cord 336 to improve runflat mode rigidity will degrade the softness of the normal inflated mode ride.

FIG. 4 is a cross-section of the bottom portion of the tire 400 of the present invention (identical to the prior art tire 200 of FIG. 2), cut along the tire's equatorial plane, when deflated and being driven in runflat mode. For clarity, only the tread 410, belts 412 and underlay 434 are shown. The footprint 444 is the portion of the tread contacting the road surface 440.

Being capable of dual-modulus, the cord 436 can be designed to be much stiffer than the prior art cord 336 under high elongation and much more flexible than the prior art cord 336 under low elongation.

In runflat mode, the footprint 444 buckles circumferentially upward, putting the inner side 450 of the tire opposite the footprint 444 under tension and the tire's outer side 452 along the footprint 444 under compression, with a neutral bending axis 442 in-between, approximately along the boundary between the belts 412 and the underlay 434. The underlay 434 is in the high tension area, and so exhibits high tensile modulus, and hence stiffens the footprint area.

On either side of the footprint 444, the tread's outward bow puts the tread's inner surface 460 under compression and outer surface 462 under tension, with the neutral bending axis 442 in-between. The underlay 434 is on the inner, compression, side of the neutral bending axis 442, and so exhibits significant compressive modulus, and hence stiffens the tread 410 on either side of the footprint 444.

In summary, in runflat mode, the underlay 434 stiffens the tire 400 both in the footprint area and on either side of the footprint.

In normal inflated operation, the footprint 444 is flat against the road surface and the tread on either side of the footprint 444 is not significantly bent, so the underlay 434 is under negligible stress, and so exhibits negligible modulus, and hence does not contribute rigidity, yielding a soft ride.

In summary, the dual-modulus underlay 434 stiffens the tire during runflat operation but not in normal inflated operation. During runflat operation, this extra rigidity better distributes the tire deflection stresses around the tire circumference, reduces rolling resistance, fatigue, wear and heat from flexing, and improves ground contact for a stabler ride. During normal inflated operation, the lack of rigidity yields a softer ride and less damage and heat from flexing. Also, the extra rigidity contributed by the underlay 434 enables employing thinner and/or fewer wedge inserts, thereby reducing weight, cost, and flexural heat.

Also, employing a dual-modulus cord 434 between the belts 412 and the carcass 416 simplifies manufacturing, because a dual-modulus cord is easier to stretch around the green carcass when expanding the green carcass against the underlay.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the spirit and scope of the appended claims.

What is claimed:

1. A pneumatic radial ply runflat tire having a tread, a belt structure, a carcass comprising two sidewalls, two beads, and at least one radial ply and an underlay disposed between the carcass and the belt structure;

the tire characterized by:

the underlay, disposed between the belts and the carcass, having one or more reinforcing cords wound substantially parallel to an equatorial plane (EP) of the tire;

the cords exhibiting negligible modulus below a threshold elongation and high modulus above the threshold elongation, whereby the underlay does not substantially stiffen the tread during normal inflated operation but does stiffen the tread during runflat operation.

2. The tire of claim 1, wherein the cords have a tensile modulus of less than 5,000 Mpa below a lower threshold elongation of 0.5–3%, and 80,000–210,000 Mpa above an upper threshold elongation of 1–3%.

3. The tire of claim 1 wherein the cords are comprised of twisted strands of filaments made with steel or polymer material or a combination of both.

4. The tire of claim 1 wherein the cords are a steel monofilament or cord, preformed into a non-straight shape.

5. The tire of claim 1 wherein the underlay is comprised of one continuous cord spirally-wound to form the entire underlay.

6. The tire of claim 1 wherein the tire has at least one wedge insert in each sidewall.

7. The tire of claim 1 wherein the underlay has multiple overlapping layers whose cords are interleaved.

* * * * *